(12) United States Patent
Okamoto et al.

(10) Patent No.: US 9,884,973 B2
(45) Date of Patent: *Feb. 6, 2018

(54) ACTIVE ENERGY RAY-CURABLE INKJET INK AND INK SET

(71) Applicants: TOYO INK SC HOLDINGS CO., LTD., Tokyo (JP); TOYO INK CO., LTD., Tokyo (JP)

(72) Inventors: Mayuko Okamoto, Tokyo (JP); Daisuke Fujiwara, Tokyo (JP); Yuji Kameyama, Tokyo (JP); Kazuhiro Jonai, Tokyo (JP)

(73) Assignees: TOYO INK SC HOLDINGS CO., LTD., Tokyo (JP); TOYO INK CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/031,263

(22) PCT Filed: Oct. 23, 2014

(86) PCT No.: PCT/JP2014/078247
§ 371 (c)(1),
(2) Date: Apr. 21, 2016

(87) PCT Pub. No.: WO2015/060397
PCT Pub. Date: Apr. 30, 2015

(65) Prior Publication Data
US 2016/0251527 A1    Sep. 1, 2016

(30) Foreign Application Priority Data

Oct. 23, 2013 (JP) ................................ 2013-220479
Oct. 23, 2013 (JP) ................................ 2013-220480

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *C09D 11/40* | (2014.01) |
| *C09D 11/322* | (2014.01) |
| *C09D 11/32* | (2014.01) |
| *C09D 11/38* | (2014.01) |

(52) U.S. Cl.
CPC ........... *C09D 11/101* (2013.01); *C09D 11/32* (2013.01); *C09D 11/322* (2013.01); *C09D 11/38* (2013.01); *C09D 11/40* (2013.01)

(58) Field of Classification Search
CPC ....... C09D 11/101; C09D 11/32; C09D 11/38; C09D 11/40; C09D 11/322
USPC .......... 522/39, 33, 6, 71, 189, 184, 1; 520/1
See application file for complete search history.

(56) References Cited

U.S. PATENT DOCUMENTS

| | | | |
|---|---|---|---|
| 6,593,390 B1 | 7/2003 | Johnson et al. | |
| 2005/0168550 A1 | 8/2005 | Deckers et al. | |
| 2007/0115335 A1 | 5/2007 | Vosahlo et al. | |
| 2010/0330296 A1* | 12/2010 | Loccufier ............ | C09D 11/101 427/511 |
| 2011/0124768 A1* | 5/2011 | Claes ................... | C09D 11/101 522/182 |
| 2012/0003435 A1* | 1/2012 | Kameyama .......... | C09D 11/101 428/195.1 |
| 2012/0147095 A1 | 6/2012 | Miura et al. | |
| 2012/0252919 A1* | 10/2012 | Suzuki ................. | C09D 11/101 522/8 |
| 2012/0281034 A1* | 11/2012 | De Meutter ......... | B41M 7/0081 347/6 |
| 2013/0139722 A1* | 6/2013 | Okamoto ............. | C09D 11/101 106/31.43 |
| 2013/0222479 A1 | 8/2013 | Houjou | |

(Continued)

FOREIGN PATENT DOCUMENTS

| | | |
|---|---|---|
| CN | 102585596 | 7/2012 |
| EP | 2305762 | 4/2011 |

(Continued)

OTHER PUBLICATIONS

"International Preliminary Report on Patentability; this report contains the following items :Form PCT/IB/338, PCT/IB/373, PCT/ISA237(cover sheet), PCT/ISA237(Box No. I),PCT/ISA237(Box No. V)", dated Apr. 26, 2016, which is English translation of "Written Opinion of the International Searching Authority", p. 1-p. 6.
"International Search Report (Form PCT/ISA/210) of PCT/JP2014/078247", dated Jan. 20, 2015, with English translation thereof, pp. 1-6.
"Office Action of Japan Counterpart Application", dated Feb. 9, 2016, pp. 1-8, with machine English translation thereof.
Gui-Fan Pei, "Screen Printing-1000 Questions", Printing Industry Press, 1st ed., with English translation thereof, Jun. 2006, pp. 231.
"Office Action of China Counterpart Application," with English translation thereof, dated Mar. 24, 2017, p. 1-p. 20.
"Search Report of Europe Counterpart Application", dated Mar. 22, 2017, p. 1-p. 7.

(Continued)

*Primary Examiner* — Jessica Whiteley
(74) *Attorney, Agent, or Firm* — JCIPRNET

(57) ABSTRACT

The present disclosure relates to an active energy ray curable inkjet ink for use in a single pass printing inkjet system, the inkjet ink containing a colorant, a monomer and at least one initiator, wherein the sum of the integrated value(s) of absorbance across wavelengths from 380 to 410 nm of the initiator(s) is at least 35, and 0.02≤amount of initiator/amount of monomer≤0.50 (weight ratio) is satisfied. The disclosure also relates to an ink set including the ink. The present disclosure is able to show printed articles that exhibit no wrinkling or tack, excellent color reproducibility, and reduced amounts of residual components within the cured film of printed articles, while offering high productivity, and can also show an active energy ray-curable inkjet ink cured film which has a low residue ratio and is of low-odor, while exhibiting similar print quality and productivity to existing printing systems.

7 Claims, No Drawings

(56) References Cited

U.S. PATENT DOCUMENTS

| | | | |
|---|---|---|---|
| 2013/0258018 A1 | 10/2013 | Nakajima et al. | |
| 2013/0286121 A1* | 10/2013 | Fukumoto | B41J 2/01 347/102 |
| 2014/0053753 A1* | 2/2014 | Suzuki | C09D 11/101 106/31.13 |
| 2014/0069294 A1* | 3/2014 | Okamoto | C09D 11/101 106/31.77 |
| 2014/0212634 A1* | 7/2014 | Kameyama | C09D 11/30 428/195.1 |

FOREIGN PATENT DOCUMENTS

| | | |
|---|---|---|
| EP | 2599842 | 6/2013 |
| EP | 2644666 | 10/2013 |
| EP | 2650338 | 10/2013 |
| JP | 2001-525479 | 12/2001 |
| JP | 2003-260790 | 9/2003 |
| JP | 2005-518971 | 6/2005 |
| JP | 2006-511684 | 4/2006 |
| JP | 2007-144685 | 6/2007 |
| JP | 2008-068516 | 3/2008 |
| JP | 2008-105387 | 5/2008 |
| JP | 2008-221651 | 9/2008 |
| JP | 2009-235137 | 10/2009 |
| JP | 2010-077203 | 4/2010 |
| JP | 2010-209199 | 9/2010 |
| JP | 2011-502188 | 1/2011 |
| JP | 2011178142 | 9/2011 |
| JP | 2012-502131 | 1/2012 |
| JP | 2012045908 | 3/2012 |
| JP | 2012-207084 | 10/2012 |
| JP | 2013-514904 | 5/2013 |
| JP | 2013-124333 | 6/2013 |
| JP | 2012180424 | 9/2013 |
| JP | 2013180424 | 9/2013 |
| JP | 2013-202935 | 10/2013 |
| JP | 2013-208807 | 10/2013 |
| WO | 2009/053305 | 4/2009 |
| WO | 2010/029017 | 3/2010 |
| WO | 2013/146063 | 10/2013 |

OTHER PUBLICATIONS

"Office Action of Japan Counterpart Application," with English translation thereof, dated Sep. 20, 2016, p. 1-p. 8.

"Office Action of Japan Counterpart Application," with English translation thereof, dated Dec. 13, 2016, p. 1-p. 6.

"Office Action of Japan Counterpart Application," with English translation thereof, dated Feb. 14, 2017.

* cited by examiner

ACTIVE ENERGY RAY-CURABLE INKJET INK AND INK SET

CROSS-REFERENCE TO RELATED APPLICATION

This application is a 371 application of the international PCT application Ser. No. PCT/JP2014/078247, filed on Oct. 23, 2014, which claims the priority benefits of Japan application No. 2013-220479, filed on Oct. 23, 2013, and Japan application No. 2013-220480, filed on Oct. 23, 2013. The entirety of each of the above-mentioned patent application is hereby incorporated by reference herein and made a part of this specification.

TECHNICAL FIELD

The present invention relates to an active energy ray-curable inkjet ink that can be used in single pass inkjet systems, and an ink set which includes the ink. In particular, the invention relates to an ink and ink set which can be used widely for labels for foodstuffs and cosmetics, exhibit low viscosity and excellent color reproducibility, produce reduced amounts of residual monomer and initiator in the cured film, and are able to reduce the occurrence of wrinkling and tack in the printed product.

BACKGROUND ART

Conventionally, active energy ray-curable inkjet inks have been mounted in high-speed printing-type signage printers due to their rapid drying properties compared with solvent-type inks in which curing requires volatilization of the solvent, or in flat head-type printers that are compatible with various substrates due to their excellent substrate adhesion properties, and the development of specific ink blends for specific applications has been progressing.

The aforementioned printers can be adapted to large-scale printing, thick-film printing and high-density printing by scanning the print head. In recent years, advances in head technology have led to the development of head technology capable of jetting very fine ink drops at high frequency. As a result of implementation of this technology, combined with the advantages of digitization, inkjet printing, which has tended to suffer from inferior productivity and image quality, is now increasingly seen as a potential alternative to existing printing systems. Moreover, as a result of the introduction of single pass printers, in which inks are discharged from at least two inkjet heads, and the inks are then cured simultaneously, lower cost equipment and increased productivity have become possible, thus accelerating the replacement of existing printing systems.

However, implementation of these technical innovations requires the development of even lower viscosity and higher sensitivity inks than those conventionally available. Reducing the viscosity contributes to improvements in the ink impact precision, and is one of the properties required of an ink to obtain high-precision images. In addition, if inkjet printing is to be used as a replacement for conventional offset printing and the like, then improvements in color reproducibility are also required. Particularly in the fields of foodstuffs and cosmetics and the like, the ability of a label to display the contents in an attractive manner has a significant influence on the sales of that particular item, and color reproducibility is one particularly important quality. However, particularly in the case of active energy ray-curable inkjet inks, satisfying all the properties required such as superior image color reproducibility, curability, and discharge stability has proven extremely difficult.

In those cases where the ink drop discharge volume is increased in order to obtain a broader color reproducibility range, the resulting images become matte, and are unsuitable as labels for foodstuffs or cosmetics. Further, if an ink is produced with increased pigment concentration in order to obtain a broader color reproducibility range, then the viscosity of the ink tends to increase and the discharge stability deteriorates. Moreover, if the pigment concentration is high, then curing tends not to proceed right through to the interior of the coating film, and residual components such as unreacted monomers and initiators in the cured film may permeate into the substrate, which raises the problem of permeation (migration) into the interior of the foodstuff or cosmetic item. Particularly in those cases where odorous components or components that are harmful to humans are contained in the raw materials for active energy ray-curable inkjet inks, this type of migration can be a serious problem.

The most effective method for preventing this type of migration is to reduce the amount of unreacted residual components within the cured film.

In order to ascertain the amount of residual components within the coating film, the cured film may be immersed in a solvent with powerful dissolution properties such as methyl ethyl ketone, and the amount of compounds eluted into the solvent then quantified.

In order to address these problems, Patent Document 1 proposes a method for producing an ink for toys and food packaging applications. However, this method requires a nitrogen environment during curing of the ink, meaning the running costs are extremely high. Further, the conveyor speed is 10 m/min, meaning productivity is also extremely poor. Moreover, it was also found that with this method, if an ink containing 1% or more of pigment was prepared, then the curability was unsatisfactory, and the amount of residual components within the cured film, measured by elution with methyl ethyl ketone, was a high value exceeding 200 ppb. Accordingly, this method cannot be used in this form for foodstuff labels. If the conveyor speed (scan rate) is slowed further to ensure adequate curing, then wrinkling and tack tend to develop on the printed articles, leading to a deterioration in the color reproducibility of the printed articles.

Patent Document 2 proposes a new type of initiator for use in foodstuff applications. However, it was found that if an ink containing 1% or more of pigment was prepared using this initiator, then the curing was unsatisfactory, the amount of residual components within the cured film when eluted with methyl ethyl ketone was a high value exceeding 200 ppb, and both wrinkling and tack tended to develop. As a result, this method cannot be used in this form for foodstuff labels.

Patent Document 3 investigates an old type active energy ray-curable inkjet system in which shuttle type curing is performed. However, because this system employs the shuttle method (where the head performs a plurality of scans, and irradiates ultraviolet rays at the same time as printing), the productivity is extremely poor. Further, if a single pass printer is used, then even if nitrogen is used, the amount of residual monomer within the cured film is large, meaning the amount of contamination (migration value) into food contents and odors are problematic for use in foodstuff applications.

Further, Patent Document 4 proposes an inkjet recording method that uses a hybrid ink which contains water and is active energy ray-curable. However, in this ink, because the monomer and initiator are substantially water-soluble, residual components can permeate readily from the cured film into foodstuffs, resulting in an increased migration value. Moreover, the water resistance of the cured film, which is an important property, is extremely poor, meaning the ink cannot be used for foodstuff packaging applications.

On the other hand, Patent Documents 5 and 6 disclose methods in which curing is performed under an oxygen concentration lower than atmospheric concentration in single pass inkjet systems. However, the inventions disclosed in these documents were designed with the purpose of improving the curability, and the amount of initiator relative to the monomer is excessive. Accordingly, odors derived from the initiator tend to leach from the coating film, and because the ink viscosity is high, the ink impact precision is poor, and image quality of a level appropriate for replacing existing printing systems cannot be obtained.

PRIOR ART DOCUMENTS

Patent Documents

Patent Document 1: JP 2011-502188 A
Patent Document 2: JP 2012-502131 A
Patent Document 3: JP 2003-260790 A
Patent Document 4: JP 2007-144685 A
Patent Document 5: JP 2008-068516 A
Patent Document 6: JP 2008-105387 A

SUMMARY OF THE INVENTION

Problems to be Solved by the Invention

The present invention provides an inkjet ink which, in active energy ray-curable inkjet printing when image formation is performed in a single pass, exhibits no wrinkling or tack, excellent color reproducibility, and reduced amounts of residual components such as unreacted monomers or initiators in the printed articles, as well as providing an ink set that includes the ink.

Further, the present invention also provides an inkjet ink that exhibits minimal odor and minimal residual components in the cured film, while maintaining similar productivity and high image quality to existing printing systems.

Means to Solve the Problems

The present invention relates to an active energy ray-curable ink for use in a single pass printing inkjet system, the ink comprising a colorant, a monomer and at least one initiator, wherein the sum of the integrated value(s) of absorbance across wavelengths from 380 to 410 nm of the initiator(s) is at least 35, and $0.02 \leq$ amount of initiator/amount of monomer $\leq 0.50$ (weight ratio) is satisfied.

Further, the present invention also relates to the aforementioned active energy ray-curable inkjet ink wherein the initiator is at least one compound selected from the group consisting of 2-benzyl-2-dimethylamino-1-(4-morpholinophenyl)-butanone-1, bis(2,4,6-trimethylbenzoyl)-phenylphosphine oxide, 2,4,6-trimethylbenzoyl-diphenyl-phosphine oxide, oligo[2-hydroxy-2-methyl-1-{4-(1-methylvinyl)phenyl}propanone] and 4,4'-diethylaminobenzophenone.

Further, the present invention also relates to the above active energy ray-curable inkjet ink wherein the monomer satisfies $0 \leq$ amount of monofunctional monomer/amount of polyfunctional monomer $\leq 0.2$ (weight ratio).

Furthermore, the present invention also relates to the above active energy ray-curable inkjet ink wherein, during irradiation of the active energy rays, curing occurs under an atmosphere in which the oxygen concentration is less than the oxygen concentration in open air.

Further, the present invention also relates to the above active energy ray-curable inkjet ink wherein the oxygen concentration in the atmosphere during irradiation of the active energy rays is from 0.5 to 10% by volume.

In addition, the present invention also relates to an active energy ray-curable inkjet ink set comprising the above ink, wherein the sum of the integrated value(s) of absorbance across wavelengths from 380 to 410 nm of the initiator(s) contained in each ink is at least 50, and the sum of the integrated value(s) of absorbance for each ink decreases in accordance with the ink discharge order.

Further, the present invention also relates to the above active energy ray-curable inkjet ink set wherein each ink is cured using a light source having an emission intensity local maximum within a wavelength range from 300 to 450 nm.

Furthermore, the present invention also relates to the above active energy ray-curable inkjet ink set wherein each ink is cured using a light source having an emission intensity local maximum at a wavelength of 380 nm or higher.

Further, the present invention also relates to the above active energy ray-curable inkjet ink set wherein the light source is a combination of a light source having an emission intensity local maximum at a wavelength of at least 380 nm but less than 450 nm, and a light source having an emission intensity local maximum at a wavelength of at least 300 nm but less than 380 nm.

Moreover, the present invention also relates to an active energy ray-cured inkjet ink cured film, produced using the active energy ray-curable inkjet ink described above.

Effects of the Invention

The present invention is able to combine the high productivity achievable using single pass inkjet systems, while providing printed articles that exhibit no wrinkling or tack, excellent color reproducibility, and reduced amounts of residual components within the cured films of the printed articles.

Further, the present invention can also provide an active energy ray-cured inkjet ink cured film which has reduced residual components in the cured film and is of low-odor while exhibiting similar print quality and productivity to existing printing systems.

EMBODIMENTS FOR CARRYING OUT THE INVENTION

The best mode for carrying out the present invention is described below. In the following description, unless specifically stated otherwise, "parts" and "%" indicate "parts by weight" and "% by weight" respectively.

(Single Pass Inkjet Systems)

The single pass inkjet system of the present invention is an inkjet printing method in which printing is completed by a single movement of the head relative to the medium that is to be printed, and is suitable for commercial printing that requires excellent printing speed. In recent years, when inkjet printing has been used as an alternative to conventional offset printing, high-speed printing of, for example, 25 m/min (meters/minute) or even 50 m/min has been expected.

Because of this rapid printing speed, the types of performance factors required of an active energy ray-curable inkjet ink (hereafter also referred to as simply "the ink") for use in a single pass inkjet system include high sensitivity to the active energy rays and good discharge stability at high frequency from the inkjet head nozzles.

In order to enhance the sensitivity of the ink to the active energy rays, increasing the polymerization reaction rate in the ink is important, whereas in order to improve the discharge stability, adjustment of physical properties such as the ink viscoelasticity is important.
(Active Energy Ray Curing)

The term "active energy rays" refers to energy rays such as electron beams, ultraviolet rays and infrared rays which affect the electron orbitals of the body being irradiated, thereby acting as a trigger for radical, cationic, or anionic or the like polymerization reactions. An "active energy ray-curable ink" describes an ink that forms a cured film upon irradiation with these types of active energy rays.

When ultraviolet rays are irradiated as the active energy rays, the use of a light source such as a high-pressure mercury lamp, iron-doped metal halide lamp, gallium lamp, low-pressure mercury lamp, ultra high-pressure mercury lamp, ultraviolet laser, LED or sunlight is preferable.

For the active energy rays in the present invention, ultraviolet rays having a wavelength of 250 nm to 450 nm can be used favorably. A light source having an emission intensity local maximum within a wavelength range from 300 to 450 nm is more preferable, and a light source having an emission intensity local maximum at a wavelength of 380 nm or higher is even more preferable.

Using a light source having an emission intensity local maximum at the ultraviolet long wavelength side (380 nm or higher), and preferably at a wavelength of 380 to 450 nm, to enable the active energy rays to penetrate into and cure the deep portions of the ink coating film, and subsequently using a light source having an emission intensity local maximum at the ultraviolet short wavelength side (380 nm or lower), and preferably at a wavelength of 300 to 380 nm, to cure the surface of the printed article is preferable.

By using a combination of light sources, as in the curing method described above, the occurrence of wrinkling in the printed article caused by the surface curing first, and the occurrence of tack caused by the surface undergoing inadequate curing, can be suppressed.

Individual light sources may be used, but combining a plurality of light sources enables the amount of residual components in the cured film to be further reduced. Specific examples includes cases where irradiation with an LED lamp is followed by irradiation with a metal halide lamp, cases where irradiation with an LED lamp is followed by irradiation with a gallium lamp, and cases where irradiation with a gallium lamp is followed by irradiation with a metal halide lamp.

When curing is performed using two or more light sources, the distance between light sources is preferably kept as short as possible, and the interval between the first irradiation and the second irradiation is preferably 1 second or less. This enables curing of both the deep portions and the surface of the printed article to proceed satisfactorily, prevents wrinkling and tack on the printed article, and can reduce the amount of residual components in the cured film.
(Oxygen Concentration During Curing)

During curing of the ink, an environment having a low oxygen concentration is preferred during irradiation of the active energy rays, and an environment in which the oxygen concentration is less than the 21% by volume oxygen concentration of open air is preferred. Specifically, the oxygen concentration within the environment is preferably from 0.5 to 10% by volume. In an environment having a low oxygen concentration, when radicals are generated during ink curing, surface curing inhibition caused by oxygen is less likely to occur, and the amount of residual unreacted monomer can be reduced more efficiently, thus promoting surface curing and reducing tack on the printed article.

The oxygen concentration can be confirmed by actual measurement of the oxygen concentration using an oxygen analyzer at a location near the printed article surface being irradiated with the active energy rays. Examples of techniques that may be used to achieve the oxygen concentration described above include the substitution of the atmosphere with an inert gas such as nitrogen or argon gas. In particular, nitrogen gas can be obtained quite cheaply, and can therefore be used favorably. Further, a gas separation method using a hollow filter such as a gas separation module enables the above type of oxygen concentration to be achieved more cheaply and easily, and is therefore also preferred.

The oxygen concentration can be measured, for example, by installing a combustion flue gas oxygen analyzer HT-1200N (manufactured by Hodaka Co., Ltd.) immediately prior to the ultraviolet irradiation unit inside the inkjet discharge apparatus.
(Active Energy Ray-Curable Inkjet Ink)

The ink of the present invention comprises at least a colorant, a monomer and an initiator.

The ink is preferably prepared by preparing a dispersion by dispersing a portion of the monomer, a dispersant, and a colorant and the like using a typical dispersion device such as a sand mill, and then adding the remainder of the monomer, the initiator, and any other additives that are required to the thus prepared dispersion. By employing this method, adequate dispersion can be achieved even using a typical dispersion device, excessive dispersion energy is not required, and an excessively long dispersion time is also not required. As a result, degeneration of the ink components during dispersion is less likely to occur, and an ink of excellent stability can be prepared.

Fine beads are preferably used during preparation of the dispersion. Specifically, if fine beads having a diameter of 0.1 mm to 2 mm are used, then a dispersion having low viscosity and favorable storage stability can be prepared, which is preferable. Moreover, the use of fine beads having a diameter of 0.1 mm to 1 mm is preferable, as it yields an ink for which the productivity of the dispersion preparation and the inkjet discharge properties are both favorable.

Following dispersion using a dispersion device, the ink is preferably filtered through a filter having a pore size of not more than 3 μm, or even 1 μm or less. Using such a filter enables an ink of favorable dischargeability to be obtained.

In terms of the dischargeability and the reliability of dot formation following ink impact, the viscosity of the ink of the present invention at 25° C. is preferably not more than 20 mPa·s. By controlling the ink viscosity to a value of 20 mPa·s or less, the discharge speed can be increased, and the impact precision can be enhanced, meaning beading (fusion of dots) caused by ink impact faults can be improved, enabling a large improvement in the image quality. The viscosity at 25° C. is more preferably from 5 to 15 mPa·s. Provided the viscosity is at least 5 mPa·s, the discharge is stable.

Measurement of the viscosity can be performed using a TVE25L viscometer manufactured by Toki Sangyo Co., Ltd., by reading the viscosity at 20 rpm under an atmosphere at 25° C.

From the viewpoints of the dischargeability and the reliability of dot formation following ink impact, the surface tension of the ink at 25° C. is preferably at least 20 mN/m but not more than 50 mN/m, and is more preferably at least 20 mN/m but not more than 35 mN/m.

Measurement of the surface tension can be performed using an automatic surface tensiometer CBVP-Z manufactured by Kyowa Interface Science Co., Ltd., by determining the surface tension when a platinum plate is wetted with the ink under an atmosphere at 25° C.

(Colorant)

The types of pigments and dyes typically used in inks for printing applications or coating material applications can be used as the colorant in the ink. The colorant can be selected in accordance with the coloration vividness and light resistance and the like required for the actual application. Examples of colorants that may be used include achromatic inorganic pigments such as a carbon black, titanium oxide and calcium carbonate, as well as colored organic pigments and dyes and the like.

Among organic pigments, quinacridone-based organic pigments, phthalocyanine-based organic pigments, benzimidazolone-based organic pigments, isoindolinone-based organic pigments, condensed azo-based organic pigments, rhodamine lake-based organic pigments, quinophthalone-based organic pigments, and isoindoline-based organic pigments and the like exhibit a good balance between light resistance and color gamut, and are consequently preferred.

Examples of the organic pigments listed in terms of their color index (C.I.) number, include: C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180 and 185, C.I. Pigment Orange 16, 36, 43, 51, 55, 59, 61, 64 and 71, C.I. Pigment Red 9, 48, 49, 52, 53, 57, 81, 81:1, 81:2, 81:4, 81:5, 97, 122, 123, 149, 168, 169, 176, 177, 180, 185, 192, 202, 206, 215, 216, 217, 220, 223, 224, 226, 227, 228, 238, 240 and 269, C.I. Pigment Violet 1, 19, 23, 29, 30, 37, 40 and 50, C.I. Pigment Blue 15, 15:1, 15:3, 15:4, 15:6, 22, 60 and 64, C.I. Pigment Green 7 and 36, and C.I. Pigment Brown 23, 25 and 26.

In particular, in terms of being able to reproduce Japan Color 2007 and FOGRA39 by adding a prescribed amount of the colorant, preferred pigments for use in yellow inks include C.I. Pigment Yellow 83, 120, 139, 150, 151, 155, 180 and 185, preferred pigments for use in magenta inks include C.I. Pigment Red 81, 81:1, 81:2, 81:4, 81:5, 122, 169, 176, 185, 202 and 269, and C.I. Pigment Violet 1 and 19, and preferred pigments for use in cyan inks include C.I. Pigment Blue 15:3, 15:4 and 15:6.

In those cases where it is preferable to use special color inks to further improve the color reproducibility, the use of C.I. Pigment Violet 23, C.I. Pigment Green 7 and 36, and C.I. Pigment Orange 43, 64 and 71 and the like is preferred.

Other colorants that can be used favorably in other inks include C.I. Pigment Black 7 and titanium oxide and the like.

Besides pigments, dyes may also be used as the colorant in the ink, and in terms of safety, dyes such as Food Red 3, 3:1, 7, 9, 17 and 17:1, Food Blue 2 and 2:1, Food Yellow 3, Food Black 1 and 2, and Food Brown 3 and the like are preferred.

In order to ensure satisfactory curability of the ink coating film, as well as favorable color gamut and weather resistance and the like for the printed article, the amount added of the colorant is preferably within a range from 0.3 to 20% by weight of the ink.

(Dispersant)

In order to improve the dispersibility of the colorant and the storage stability of the ink, a dispersant is preferably added to the ink of the present invention. Examples of compounds that can be used as the dispersant include hydroxyl group-containing carboxylate esters, salts of long-chain polyaminoamides and esters of high-molecular weight acids, salts of high-molecular weight polycarboxylic acids, salts of long-chain polyaminoamides and esters of polar acids, esters of high-molecular weight unsaturated acids, modified polyurethanes, modified polyacrylates, modified polyesters, and polyetherester-based anionic surfactants.

In terms of reducing the viscosity of the ink and improving the storage stability, the use of a resin-type dispersant such as a modified polyurethane, modified polyacrylate or modified polyester is preferable. Among these, resin-type dispersants having a basic functional group exhibit excellent high frequency properties and enable a dispersion of favorable storage stability to be obtained, and are consequently preferred.

Specific examples of the dispersant include Disperbyk-161, 162, 163, 164, 165, 166, 167, 168 and 170 (high-molecular weight copolymers) manufactured by BYK Chemie GmbH, EFKA PA4414 and EFKA PX 4701, 4731 and 4732 manufactured by BASF Corporation, SOLSPERSE 5000 (a phthalocyanine ammonium salt system), 13940 (a polyesteramine system), 17000 (a fatty acid amine system), and 24000GR, 32000, 33000, 39000, 41000, 53000, 76400, 76500, J100 and J180 (polyethyleneimine systems) manufactured by The Lubrizol Corporation, AJISPER PB821, 822, 824, 827 and 711 manufactured by Ajinomoto-Fine-Techno Co., Inc., and TEGO Dispers 685 manufactured by Tego Chemie Service GmbH.

The amount added of the dispersant is selected in accordance with the colorant used, while ensuring the desired level of stability. When a resin-type dispersant is used, an amount equivalent to a weight ratio of the active component of the resin-type dispersant, namely the solid fraction (non-volatile fraction) of the resin-type dispersant, relative to the colorant of 0.2 to 1.5 yields superior fluidity properties for the ink. Within this range, the dispersion stability of the ink is favorable, and ink quality similar to the initial quality is retained even after standing for a long period. Moreover, if the above weight ratio is from 0.3 to 1.0, then the dispersion is extremely stable, and stable dischargeability is obtained even in the high frequency region of 20 kHz or higher, meaning excellent precision and productivity can be achieved, which is more preferable. A weight ratio of 0.3 to 0.7 is even more preferable.

In addition, in order to further improve the dispersibility of the pigment and the ink storage stability, a derivative of an organic pigment (hereafter referred to as a "pigment derivative") may also be added to the pigment dispersant.

The pigment derivative is an organic compound which has an organic pigment as the basic backbone structure, and is obtained by introducing a substituent such as a sulfonic acid, sulfonamide group, aminomethyl group or phthalimidomethyl group as a side chain.

The amount added of the pigment derivative may be determined as appropriate to ensure the desired level of stability. For example, from the viewpoint of the ink fluidity properties, the weight ratio of the pigment derivative relative to the pigment is preferably within a range from 0.03 to 0.12. A ratio in this range yields good dispersion stability for the ink, and ensures that ink quality similar to that immediately following production is retained even after the ink has been stored for a long period, and is consequently preferably employed.

(Monomer)

In the present description, the "monomer" describes the compound which, upon irradiation with the active energy rays, or under the action of a photopolymerization initiator, undergoes a polymerization reaction. Examples of the monomer include monofunctional monomers, and polyfunctional monomers having two or more functional groups, and specific examples include acrylic monomers, vinyl monomers, vinyl ether monomers, vinyl ester monomers, hybrid polymerizable monomers containing an acryloyl group and a vinyl group within the molecule, allyl ether monomers, and allyl ester monomers. In terms of the ink curability, monofunctional monomers and difunctional monomers are preferable, and in terms of reducing the ink viscosity, reducing the amount of residues in the cured film, and reducing odors, monofunctional acrylic monomers, difunctional acrylic monomers, and the above types of hybrid polymerizable monomers and the like can be used preferably. Monomers having a viscosity at 25° C. of 1 to 20 mPa·s are preferable.

Examples of monofunctional monomers include benzyl (meth)acrylate, (ethoxylated (or propoxylated)) 2-phenoxyethyl (meth)acrylate, dicyclopentenyl(oxyethyl) (meth)acrylate, phenoxydiethylene glycol (meth)acrylate, 2-methoxyethyl (meth)acrylate, methoxytriethylene glycol (meth)acrylate, 2-ethoxyethyl (meth)acrylate, ethoxyethoxyethyl (meth)acrylate, methoxydipropylene glycol (meth)acrylate, dipropylene glycol (meth)acrylate, (β-carboxylethyl (meth)acrylate, trimethylolpropane formal (meth)acrylate, isoamyl (meth)acrylate, cyclohexyl (meth)acrylate, t-butylcyclohexyl (meth)acrylate, tetrahydrofurfuryl (meth)acrylate, isobornyl (meth)acrylate, dicyclopentanyl (meth)acrylate, isooctyl (meth)acrylate, lauryl (meth)acrylate, tridecyl (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine, N-vinylcaprolactam, N-vinylpyrrolidone, N-vinylformamide and N-acryloyloxyethyl hexahydrophthalimide.

Examples of difunctional monomers include dimethyloltricyclodecane di(meth)acrylate, (ethoxylated (or propoxylated)) bisphenol A di(meth)acrylate, cyclohexanedimethanol di(meth)acrylate, (poly)ethylene glycol di(meth)acrylate, (ethoxylated (or propoxylated)) 1,6-hexanediol di(meth)acrylate, 1,9-nonanediol diacrylate, 1,10-decanediol diacrylate, (ethoxylated (or propoxylated)) neopentyl glycol di(meth)acrylate, hydroxypivalic acid neopentyl glycol di(meth)acrylate, dipropylene glycol di(meth)acrylate, (neopentyl glycol-modified) trimethylolpropane di(meth)acrylate, tripropylene glycol di(meth)acrylate, dicyclopentanyl di(meth)acrylate, triethylene glycol divinyl ether and 2-(2-vinyloxyethoxy)ethyl acrylate.

Examples of trifunctional or higher monomers include pentaerythritol tri (or tetra) (meth)acrylate, trimethylolpropane tri (or tetra) (meth)acrylate, tetramethylolmethane tri (or tetra) (meth)acrylate and dipentaerythritol hexa(meth)acrylate.

The above monomers may be used individually, or a combination of two or more monomers may be used.

The use of a difunctional monomer as the monomer is preferred, and among the various possibilities, in terms of the curability of the ink coating film, the use of a monomer having EO (ethylene oxide) or PO (propylene oxide) as the main backbone is preferable. A monomer having EO or PO as the main backbone refers to a monomer which includes EO or PO in the portion of the molecule excluding the reactive groups such as the acryloyl groups, vinyl groups or vinyl ether groups.

The molecular weight of the monomer used in the present invention is preferably at least 150 but not more than 300. Until now, countermeasures against migration and odors have simply involved using a high-molecular weight raw material. Even the EuPIA Guideline on printing inks applied to the non-food contact surface of food packaging materials and articles (published November 2011-corrigendum July 2012), published by EUPIA (European Printing Ink Association), recommends raw materials having a molecular weight of 1,000 or higher for inks for food packaging that do not contact food. However, in inkjet inks, high-molecular weight components cause a deterioration in image quality due to increased ink viscosity, and a deterioration in the polymerization reactivity (curing faults). In the present invention, the inventors discovered that, unexpectedly, the use of a monomer having a molecular weight of 300 or less was preferable in terms of reducing the amount of residual components in the cured film. Further, because these monomers have a comparatively low viscosity, the ink exhibits excellent discharge properties, enabling stable discharge to be achieved even during high-speed printing. Provided this type of performance can be achieved, the monomer is not limited to the specific monomers mentioned above. Although monomers having a molecular weight of less than 150 exhibit high reactivity, even a very small amount of residual monomer tends to migrate completely into the foodstuff, and because the potential harm upon ingestion is quite high, the molecular weight of the monomer is preferably 150 or higher.

Further, although a monomer having a molecular weight exceeding 300 may be added, as described above, if such a monomer is added in a large amount, then there is a possibility it may cause an increase in viscosity and a deterioration in reactivity. In the present invention, by restricting the amount of monomers having a molecular weight exceeding 300 to not more than 15% by weight of the ink composition, improved image quality due to a reduced viscosity, and a lower residue ratio can be achieved, which is preferable.

Specific examples of monomers that can be used favorably as the monomer having EO or PO as the main backbone include difunctional monomers such as 2-(2-vinyloxyethoxy)ethyl acrylate (VEEA), dipropylene glycol diacrylate (DPGDA), triethylene glycol divinyl ether, tricyclodecanedimethanol diacrylate and tripropylene glycol diacrylate. These difunctional monomers allow ready propagation of radicals from the initiator, thus improving the reaction rate between the initiator and the monomer, and by using one of these monomers, either alone or in combination with one or more other monomers, the amount of residual components in the cured film can be reduced, even in high-speed printing. Further, these monomers have comparatively low viscosity and high sensitivity. Accordingly, it is preferable because they can be discharged in a stable manner even during high-speed printing in a single pass inkjet system, and enable a favorable reduction in the amount of residual components in the cured film and good suppression of wrinkling and tack on the printed articles.

In terms of reducing the viscosity of the ink and reducing the amount of residual components, the amount of the above difunctional monomer in the ink is preferably from 30 to 100% by weight, more preferably from 40 to 100% by weight, and particularly preferably from 50 to 100% by weight, of the total monomer component.

In particular, if VEEA is used as the monomer, then because the reactivity improves significantly, the amount of the initiator added can be reduced, and the amount of residual components can be further reduced, which is preferable. The amount added of VEEA is preferably from 10 to 60% by weight, more preferably from 15 to 45% by weight, and particularly preferably from 20 to 30% by weight, of the ink.

When a monofunctional monomer is used in combination with the polyfunctional monomer, ensuring that the total amount of the monofunctional monomer and the difunctional or higher polyfunctional monomer is at least 50% by weight of the ink is preferred, as it ensures superior curability and favorable dischargeability as an inkjet ink. A total amount of 70% by weight or more is even more preferable, as it yields a satisfactorily high degree of curability even with a low level of irradiation.

From the viewpoints of odor and viscosity, the monofunctional monomer is preferably 2-phenoxyethyl acrylate, lauryl acrylate, tetrahydrofurfuryl acrylate, isodecyl acrylate, isooctyl acrylate, tridecyl acrylate, or isobornyl acrylate or the like.

Among these, in terms of the curability and odor, an aliphatic ethylenic polymerizable compound such as a monofunctional (meth)acrylate is preferable, and in terms of the image quality of color printing, the use of a monofunctional polymerizable compound having a surface tension at 25° C. of not more than 38 mN/m is preferred. For example, from the viewpoints of odor and viscosity, lauryl acrylate (30.3 mN/m), tetrahydrofurfuryl acrylate (36.1 mN/m), isodecyl acrylate (28.6 mN/m), isooctyl acrylate (28 mN/m), tridecyl acrylate (28.9 mN/m), or isobornyl acrylate (31.7 mN/m) or the like is preferred.

Furthermore, in the present invention, the ratio between the monofunctional monomer and the polyfunctional monomer preferably satisfies 0≤amount of monofunctional monomer/amount of polyfunctional monomer≤0.2. A ratio in this range suppresses the amount of unreacted monomer residues in the cured film, yields a low migration value, and enables a cured film of reduced odor to be obtained. A ratio that satisfies 0≤amount of monofunctional monomer/amount of polyfunctional monomer≤0.15 is more preferable. Although monofunctional monomers are useful for reducing the viscosity with the aim of achieving improved ink impact precision, they exhibit poor reactivity. The lower the amount of monofunctional monomer added, the lower the residue ratio becomes, which is preferable.

Besides the monomer described above, oligomers and prepolymers may also be used in the ink, but for reasons including the ink viscosity, and the amount of residues in the cured film, the amount of oligomers and prepolymers is preferably not more than 15% by weight, and more preferably not more than 5% by weight, of the ink composition.

(Initiator)

In the present invention, the term initiator is a general term describing compounds which, upon irradiation with active energy rays, generate radical active species that initiate a polymerization reaction, and includes not only photoradical polymerization initiators, but also sensitizers. The initiator may be selected as appropriate in accordance with the curing rate, the cured coating film properties and the colorant material.

In the present invention, the use of an initiator that exhibits light absorption of wavelengths from 380 nm to 410 nm is preferable, and examples include acylphosphine oxide-based initiators, α-aminoacetophenone-based initiators, benzophenone-based initiators and thioxanthone-based initiators. By using such an initiator, curing proceeds efficiently through to deep portions of the ink coating film, satisfactory curing can be achieved even when two or more colors are overprinted, wrinkling and tack are prevented, and the amount of residual components such as the initiator or monomer within the cured printed article is reduced.

Specific examples of the initiator include 2,4,6-trimethylbenzoyl-diphenyl-phosphine oxide, bis(2,4,6-trimethylbenzoyl)-phenylphosphine oxide, 2,4-diethylthioxanthone, 2-isopropylthioxanthone, oligo(2-hydroxy-2-methyl-1-(4-(1-methylvinyl)phenyl)propanone), 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2-[4-(methylthiobenzoyl)]-2-(4-morpholinyl) propane, 2-hydroxy-1-{4-[4-(2-hydroxy-2-methyl-propionyl)-benzyl]phenyl}-2-methyl-propan-1-one, 1-hydroxycyclohexyl phenyl ketone, {4-[(4-methylphenyl)thio]phenyl}phenylmethanone, ethyl 4-(dimethylamino)benzoate, 1-[4-(2-hydroxyethoxy)phenyl]-2-hydroxy-2-methyl-1-propan-1-one, 4,4'-bis(dimethylamino)benzophenone, 4,4'-diethylaminobenzophenone, 1-[4-(4-benzoylphenylsulfanyl)phenyl]-2-methyl-2-[(4-methylphenyl)sulfonyl]propan-1-one, and (methylimino) diethane-2,1-diyl (4-dimethylaminobenzoate). The use of a combination of two or more of the above initiators is more preferable. By combining two or more initiators that absorb different wavelengths, the active energy rays irradiated after ink discharge can be adequately utilized across a broader wavelength range, and the amount of residual monomer can be greatly reduced, which is preferable.

Among the various possibilities, the initiator preferably includes at least one compound selected from the group consisting of 2-benzyl-2-dimethylamino-1-(4-morpholinophenyl)-butanone-1, bis(2,4,6-trimethylbenzoyl)-phenylphosphine oxide, 2,4,6-trimethylbenzoyldiphenylphosphine oxide, oligo[2-hydroxy-2-methyl-1-{4-(1-methylvinyl)phenyl}propanone] and 4,4'-diethylaminobenzophenone. By using such an initiator, the generated radicals are unlikely to undergo oxygen trapping that leads to reaction termination, and the polymerization reaction of the monomer in the ink can proceed efficiently, meaning the amount of unreacted residual monomer in the cured film can be effectively reduced, which is preferable.

Further, when printing is performed at a thick film thickness exceeding the 5 μm characteristic of inkjet printing, curing irregularities may sometimes occur. When printing is performed using a single pass inkjet system and active energy rays are irradiated onto the ink, the amount of energy rays irradiated through to the ink positioned as the lower layer (the ink discharged first) is attenuated, and therefore it is preferable that those colors positioned at lower layers (namely, those colors discharged first) are designed with higher curing sensitivity.

Specific examples of suitable design methods include increasing the amount of initiator included in the ink discharged first compared with the ink(s) discharged later.

The initiator described above is preferably included in the ink in an amount of 0.5 to 25% by weight, and this amount is more preferably from 2 to 20% by weight, and still more preferably from 3 to 13% by weight. Provided the amount satisfies this range from 0.5 to 25% by weight, a combination of superior curability, a reduction in the amount of residual components in the cured film, and a reduction in odor can be achieved.

For the initiator described above, the sum of the integrated value(s) of absorbance in a wavelength band from 380 to 410 nm is at least 35. Here, the "integrated value of absorbance" is obtained by determining the value obtained by integrating the absorbance of a 1% by weight acetonitrile solution of each initiator across wavelengths from 380 to 410 nm, and then multiplying this integrated value by the concentration (% by weight) in the ink of the initiator. The "sum" of the integrated values of absorbance is the total of the integrated values of absorbance for all the initiators contained within the ink. For example, if the ink contains an initiator X at a concentration of $C_X$ (% by weight) and an initiator Y at a concentration of $C_Y$ (% by weight), then the sum S of the integrated values of absorbance is represented by the following formula:

$$S = C_X \times \int A_X d\lambda + C_Y \times \int A_Y d\lambda$$

In the above formula, λ represents the wavelength (nm), $A_X$ represents the absorbance (Abs) of the initiator X, and $A_Y$ represents the absorbance of the initiator Y. In the present invention, the absorbance and the integrated value thereof was measured using a V570 UV/VIS/NIR Spectrophotometer manufactured by JASCO Corporation.

Provided the sum of the integrated value(s) of absorbance across wavelengths from 380 to 410 nm is at least 35, curing occurs satisfactorily right down to the deep portions of the ink coating film, wrinkling and tack can be reduced, and the amount of residual components is minimal. This sum of the integrated value(s) of absorbance is preferably 50 or greater. In such cases, satisfactory curing can be achieved even when a thick film is formed, such as when two or more colors are printed.

(Initiator/Monomer Ratio)

The ratio (weight ratio) of the initiator relative to the monomer satisfies 0.02≤initiator/monomer≤0.5. By controlling this ratio to a value in this range, a combination of a reduction in the amount of residual components in the cured film and a reduction in the odor level can be achieved. This ratio preferably satisfies 0.02≤initiator/monomer≤0.16, and more preferably satisfies 0.05≤initiator/monomer≤0.14. In the present invention, during curing, by irradiating the active energy rays under an atmosphere in which the oxygen concentration is less than the oxygen concentration in open air, the radical polymerization reaction is able to proceed efficiently, and the amount of residual components in the cured film can be reduced.

(Additives)

Besides the colorant, dispersant, monomer and initiator described above, the inkjet ink of the present invention may also include one or more additives. Examples of these additives include polymerization inhibitors, surface tension regulators, organic solvents, existing defoaming agents, fluidity modifiers, fluorescent brighteners and antioxidants.

(Polymerization Inhibitors)

In order to enhance the stability of the ink viscosity over time, the discharge stability with time, and the stability of the ink viscosity upon standing in an inkjet recording device, a polymerization inhibitor (hereafter referred to as an "inhibitor") may be used. Examples of compounds that can be used particularly favorably as inhibitors include hindered phenol-based compounds, phenothiazine-based compounds, hindered amine-based compounds and phosphorus-based compounds.

Among these inhibitors, in terms of solubility in the ink and the color of the inhibitor itself, the hindered phenol-based compounds "BHT SWANOX" and "NONFLEX Alba" manufactured by Seiko Chemical Co., Ltd., and "H-BHT" manufactured by Honshu Chemical Industry Co., Ltd., the phenothiazine-based compounds "Phenothiazine" manufactured by Seiko Chemical Co., Ltd. and "Phenothiazine" manufactured by Sakai Chemical Industry Co., Ltd., the hindered amine-based compound "HO-TEMPO" manufactured by Evonik Degussa GmbH, and the phosphorus-based compound "Triphenylphosphine" manufactured by BASF Corporation can be used favorably. These polymerization inhibitors may be used individually, or if necessary two or more inhibitors may be used.

The amount of the inhibitor is preferably from 0.1 to 2% by weight of the ink, and more preferably from 0.1 to 1.5% by weight. An amount in this range enables a combination of good ink storage stability and good ink coating film curability in single pass inkjet printing to be achieved, and enables the amount of residual components in the cured film when two or more colors are overprinted to be reduced, and is consequently preferred.

(Surface Tension Regulators)

In the present invention, a surface tension regulator may be added to improve the wet spreadability of the ink on the printing medium.

Specific examples of the surface tension regulator include BYK-350, 352, 354, 355, 358N, 361N, 381N, 381 and 392 (acrylic-based copolymers), and BYK-300, 302, 306, 307, 310, 315, 320, 322, 323, 325, 330, 331, 333, 337, 340, 344, 348, 349, 370, 375, 377, 378, 355, 356, 357, 390, UV3500, UV3530 and UV3570 (silicon-based compounds) manufactured by BYK-Chemie GmbH; and Tegorad-2100, 2200, 2250, 2500 and 2700 (silicon-based acrylates), and TEGO (a registered trademark) Glide 100, 110, 130, 403, 406, 410, 411, 415, 432, 435, 440, 450 and 482 (polyether-modified polysiloxane copolymers) manufactured by Evonik Degussa GmbH, but this is not an exhaustive list. These surface tension regulators may be used individually, or if necessary two or more surface tension regulators may be used.

In terms of preventing repellency caused by the compatibility of the surface tension regulator, the surface tension regulator is preferably a silicon-based compound, and is more preferably a polyether-modified polysiloxane.

Furthermore, a reactive surface tension regulator having a carbon-carbon double bond within the molecule is also preferred, because such a reactive surface tension regulator can be incorporated into the cured film upon curing, enabling further reduction in the amount of residual components in the coating film. Examples of such reactive surface tension regulators include Tegorad-2100 and 2200, and BYK-UV3500, UV3530 and UV3570.

The surface tension regulator is preferably included in the ink in an amount of 0.01 to 5% by weight. Provided the amount is at least 0.01% by weight, the wet spreadability of the ink on the substrate can be improved, enabling a favorable image to be obtained, and provided the amount is less than 5% by weight, the amount of residual components in the coating film can also be reduced, without impairing the curing of the ink coating film.

(Organic Solvents)

An organic solvent may be added to the ink to reduce the viscosity and improve the wet spreadability on substrates.

There are no particular limitations on the organic solvent, and the types of glycol monoacetates, glycol diacetates, glycols, glycol ethers, and lactate esters and the like typically used in solvent-based inkjet inks may be added. However, because the probability of residual organic solvent remaining in the cured film is high, and the risk of migration is also increased, the amount added of the organic solvent is preferably not more than 10% by weight of the ink, and is most preferably 3% by weight or less.

Examples of preferred organic solvents include glycol monoacetates and glycol ethers, and of these, ethylene glycol monobutyl ether acetate and diethylene glycol diethyl ether are preferred.

(Moisture Content Control)

The ink of the present invention contains essentially no water. The expression "contains essentially no water" means that no water is added intentionally to the ink, and does not exclude unavoidable traces of water included within the various added components. If water is added to the ink, then the radicals generated during irradiation with the active energy rays tend to be trapped, the polymerization reaction is unable to proceed efficiently, and the amount of residual components in the cured film tends to increase. The water content in the ink is preferably not more than 1.0% by weight, and it is preferable that production of the ink is performed with the raw materials and production steps managed so that the moisture content is suppressed to 0.5% by weight or less.

(Ink Set)

The present invention also relates to an ink set comprising two or more of the above inks of different colors. For example, the colors may be selected from cyan, magenta, yellow, black, or white or the like. Moreover, in addition to these color inks, in order to obtain the target printed article and from the viewpoint of the color reproducibility, so-called intermediate colors or secondary colors such as light cyan, light magenta, grey, orange, violet, and green and the like may also be used, and other color inks may also be used.

In the ink set of the present invention, the order of discharge for each of the inks to be printed is not particularly limited by the ink color.

Generally, in those cases where cyan, magenta, yellow and black inks are used, discharge is performed in the order of cyan, magenta, yellow and then black, and if white is also added to the ink set, then discharge is typically performed in the order of white, cyan, magenta, yellow and then black.

In the ink set of the present invention, the sum of the integrated values of absorbance across wavelengths from 380 to 410 nm of all the initiators (hereafter termed the "total absorbance") for each ink decreases in accordance with the ink discharge order.

Compared with light of short wavelengths from 250 nm to 380 nm, light of longer wavelengths from 380 nm to 410 nm is more able to penetrate down to the deep portions of the coating film. Accordingly, by first discharging the ink having the largest total absorbance for the initiators from 380 nm to 410 nm, and ensuring that the ink that has been discharged first is well cured by these penetrating light rays of 380 nm to 410 nm during ink curing, wrinkling of the printed article can be prevented, and the amount of residual components in the cured film can also be reduced.

In contrast, if the ink having a larger total absorbance for the initiators from 380 nm to 410 nm is discharged later, then the top of the ink coating film surface tends to cure first, thereby impeding penetration of the light rays down to the deep portions, and therefore the deep portions of the ink coating film do not cure satisfactorily, which can cause wrinkling, and the amount of residual components in the cured film also increases.

One method for improving the efficiency of the ink curing reaction involves increasing the amount of initiator in the ink that is discharged last, but this method suffers from a number of problems, including increased ink cost and a deterioration in the storage stability. By employing the present invention, these problems can be avoided.

(Residual Components in Cured Film)

In the present invention, the residual components in the cured film refer to unreacted monomer and initiator and the like that can be extracted from the cured film. Identification and quantification of this monomer and initiator can be achieved using, for example, GCMS (Gas Chromatography Mass Spectrometry), LCMS (Liquid Chromatography Mass Spectrometry), and HPLC (High Performance Liquid Chromatography), and these analysis techniques may be selected as appropriate in accordance with the ease of quantification.

Although details relating to the method for measuring the residual components in the cured film are described below in the following EXAMPLES, in a typical example, the cured film, including the substrate, is cut into 1 cm squares, and is then immersed for three days at 60° C. in a sealed container containing 100 ml of methyl ethyl ketone to extract the residual components from within the coating film. After three days, the stirred and homogenous methyl ethyl ketone is removed from the container, the extracted components are identified by GCMS (GCMS-QP2010 Plus, manufactured by Shimadzu Corporation) and HPLC (manufactured by Shimadzu Corporation), calibration curves are prepared for the detected compounds, and the amount of each compound is then quantified to calculate the amount of residual components in the cured film.

(Residue Ratio)

The residue ratio of unreacted components in the cured film indicates the ratio of the weight (g) of residual monomer and initiator and the like in the cured film quantified using the method described above, relative to the cured film weight (g). This residue ratio correlates strongly with the migration value in the migration test prescribed by the EU for food packaging applications, and reducing this residue ratio is essential for food packaging applications. Further, in the present invention, as described above, an ink containing a large amount of a monomer having a comparatively low molecular weight is used to design an ink of reduced viscosity.

Monomers having a comparatively low molecular weight generally have odors, and if the residue ratio is high, a problem arises in that odors are generated from the cured film. Particularly in markets such as Japan having very stringent quality standards, reduction of the residue ratio is essential. In other words, it could be said that in foodstuff packaging markets, providing a cured film in which the amount of residual low-molecular weight components (unreacted components) has been reduced as far as possible is the key to meeting market demand and taking over existing markets.

(Resolution and Printing Speed)

The image quality of single pass piezo-driven inkjet printing is usually determined by the resolution, which is expressed in dpi (dots per inch), and the gradation or drop volume per single dot.

Of these factors, the resolution in the direction perpendicular to the print direction (the direction of movement of the printing substrate) is determined by the integration density of the inkjet head nozzles. On the other hand, the resolution in the direction horizontal to the print direction is determined by the piezo drive frequency (the ink discharge frequency). This resolution in the direction horizontal to the print direction differs depending on the head specifications of the manufacturer, and two different modes exist, namely the binary mode which expresses one dot in terms of the volume of a single drop (drop volume), and the gradation mode which is formed from a plurality of drops. In order to provide a viable alternative to existing printing markets, a combination of good quality and high productivity are essential. There is a trade-off in that, in binary mode, although the printing speed is high, a high-precision image cannot be obtained, whereas in gradation mode, a high-precision image can be obtained with comparative ease, but the printing speed falls dramatically, meaning a deterioration in productivity.

In recent years, heads that are able to address this trade-off have started to appear on the market, and are beginning to sweep through existing printing markets. In particular, in order to achieve image quality of a similar level to existing printing, the minimum drop volume is preferably reduced to as small a value as possible, and the minimum drop volume is preferably 10 pL or less. In order to obtain even higher quality images, image formation using a drop volume of 6 pL or less is even more preferable.

On the other hand, it was found that the issue described below was a serious problem for active energy ray-curable inkjet inks printed using an aforementioned drop volume of 10 pL or less. Specifically, the amount of residual components in the cured film is not a problem when solid printing is performed at a printing coverage rate of 100%, but in typical images where the printing coverage rate is less than 100%, despite the fact that the amount of ink per unit of surface area is less than that observed for solid printing, the residue ratio for the cured film tends to increase, and the migration value also tends to increase. This is because when the ink drops are small, the surface area increases, meaning the effect of oxygen inhibition during curing increases.

In the present invention, in order to achieve a combination of high image quality and high productivity that provides a viable alternative to existing printing, the resolution is preferably at least 360×360 dpi, or even 600×600 dpi or higher depending on the application. Further, a drop volume of 6 pL or less is preferable, as it enables the image quality to be improved significantly.

Furthermore, in the present invention, in order to enable ink with a drop volume of 10 pL or less to be cured satisfactorily, the oxygen concentration in the curing atmosphere is preferably within a range from 1 to 10% by volume, and a ratio that satisfies $0.05 \leq \text{initiator/monomer} \leq 0.14$ enables a high-quality image to be formed more effectively, and yields a lower residue ratio.

Specific examples of the inkjet head include heads manufactured by Kyocera Corporation and Xaar plc., but there are no particular limitations on the head, provided it is capable of printing with a drop volume of 10 pL or less in order to achieve high resolution.

The printing speed is dependent on the piezo drive frequency of the head, and in the present invention, printing is preferably performed at a printing speed of at least 40 m/min. A printing speed of 50 m/min or faster is even more preferable.

Achieving a small drop volume and enabling discharge at a high frequency are dependent on the know-how of the inkjet head, and obtaining fluidity properties that are able to cope with such an inkjet head is dependent on the know-how of the ink.

The present invention has an object of achieving high image quality and a high printing speed, while obtaining a cured film having the type of low odor and low residue ratio that is applicable to foodstuff packaging applications. The inventors discovered that in order to achieve this object, not only the head and the ink, but a variety of other factors including the atmosphere during curing needed to be controlled.

(Printing Substrate)

The ink or ink set of the present invention can be printed onto the types of film or paper substrates typically used for labels and packaging materials. For label applications, tacky papers and tacky films sold in a form in which an adhesive and a separate sheet of paper are bonded to each other can be used. Further, substrates having a gas or liquid barrier function, such as aluminum metallized films, can also be used.

Because the ink or ink set of the present invention yields a low residue ratio in the cured film, the ink can be used effectively on substrates such as typical coated papers and plastic films for which there is a significant possibility of permeation of residual components from the cured film.

When a substrate having high permeability such as a coated paper or a plastic film is used, it is preferable that a preliminary curing, or the main curing step, is performed at least once within 0.5 seconds of initial ink impact. This enables the residue ratio to be reduced even more effectively.

Further, formation of an anchor coat of resin or the like on the substrate, or modification of the substrate surface by corona treatment are also effective in suppressing the permeation (migration) of residual components from the cured film.

EXAMPLES

The present invention is described below in further detail using a series of examples, but the scope of rights of the present invention is in no way limited by the following examples. In the examples, "parts" represents "parts by weight".

Examples 1 to 9, Comparative Example 1 to 5

<Preparation of Inks>

For the dispersions used for each of the colored inks of yellow, magenta, cyan and black, a colorant dispersion of each color was obtained by mixing 30 parts of the colorant, 15 parts of the dispersant SOLSPERSE 32000 (a polyethyleneimine-based basic dispersant manufactured by The Lubrizol Corporation) and the monomer DPGDA (dipropylene glycol diacrylate, manufactured by BASF Corporation), and then dispersing the mixture for one hour using a microbeads dispersion device (DCP mill). During the dispersion, Zr beads having a diameter of 0.3 mm were used at a volume fill rate of 75%.

Monomers other than DPGDA, initiators, an inhibitor and a surface tension regulator were then added sequentially under stirring to 8.3 parts of each of the thus obtained colorant dispersions to obtain the formulations shown in Table 1, and each of the resulting mixtures was then shaken for 6 hours in a shaker to achieve dissolution. Each of the obtained liquids was filtered through a PTFE filter having a pore size of 0.5 microns to remove any coarse particles, thus completing preparation of the inks 1 to 10 shown in Table 1.

Details of the ink components listed in Table 1 and Table 3 are shown below.

(Colorants)

PY180: C.I. Pigment Yellow 180 "Noveperm Yellow PH-G" (a yellow pigment, manufactured by Clariant AG)

PV19: C.I. Pigment Violet 19 "Inkjet Magenta E5B02" (a magenta pigment, manufactured by Clariant AG)

PB15:3: C.I. Pigment Blue 15:3 "LIONOL BLUE FG-7400-G" (a cyan pigment, manufactured by Toyo Color Co., Ltd.)

PB7: C.I. Pigment Black 7 Special Black 350 (a carbon black, manufactured by Degussa AG)

(Dispersant)

SP32000: a polyethyleneimine-based basic dispersant "SOLSPERSE 32000" manufactured by The Lubrizol Corporation Irg819: bis(2,4,6-trimethylbenzoyl)-phenylphosphine oxide (manufactured by BASF Corporation), integrated absorbance: 2.25

Irg369: 2-benzyl-2-dimethylamino-1-(4-morpholinophenyl)-butanone-1, integrated absorbance: 4.38

(Inhibitor)

Phenothiazine: phenothiazine (manufactured by Seiko Chemical Co., Ltd.)

(Additive)

UV3510: BYK-UV3510 (a surface tension regulator, a polyether-modified polysiloxane manufactured by BYK Chemie GmbH)

TABLE 1

| | | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|---|
| Colorant | PB15:3 | 2.5 | 2.5 | 2.5 | 2.5 | | | | | | |
| | PV19 | | | | | | | | | | |
| | PY180 | | | | | | | 2.5 | 2.5 | 2.5 | 2.5 |
| | PB7 | | | | | 2.5 | 2.5 | | | | |
| Dispersant | SP32000 | 1.25 | 1.25 | 1.25 | 1.25 | 1.25 | 1.25 | 1.25 | 1.25 | 1.25 | 1.25 |
| Monomers | VEEA | 23 | 23 | 23 | 23 | 23 | 23 | 23 | 23 | 23 | 23 |
| | DPGDA | 50.15 | 58.15 | 34.15 | 52.15 | 52.15 | 58.65 | 52.35 | 51.65 | 53.25 | 56.15 |
| | DCPA | 9 | 9 | 9 | 9 | 9 | 9 | 9 | 9 | 9 | 9 |
| Initiators | EAB | 1 | 5 | 5 | 1 | | 5 | 0.6 | 3 | 0.8 | |
| | TPO | 11 | 3 | 15 | 6 | 6.5 | | 7.5 | 5 | 9.5 | 2 |
| | ESACURE ONE | 2 | | 5 | 6 | | | | 2 | | 5 |
| | Irg819 | 2 | | 5 | 1 | 3.3 | | 2 | 2 | 2 | 3 |
| | Irg369 | | | 2 | | 1.7 | | 1.2 | | 0.6 | |
| Inhibitor | phenothiazine | 0.1 | 0.1 | 0.1 | 0.1 | 0.1 | 0.1 | 0.1 | 0.1 | 0.1 | 0.1 |
| Additive | UV3510 | 0.5 | 0.5 | 0.5 | 0.5 | 0.5 | 0.5 | 0.5 | 0.5 | 0.5 | 0.5 |
| Sum of integrated values of absorbance from 380 to 410 nm | | 170 | 267 | 416 | 114 | 87 | 240 | 122 | 204 | 147 | 28 |
| Amount of initiator/amount of monomer | | 0.19 | 0.09 | 0.48 | 0.17 | 0.14 | 0.06 | 0.13 | 0.14 | 0.15 | 0.11 |

(Monomers)

LA: lauryl acrylate (a monofunctional monomer, manufactured by Osaka Organic Chemical Industry Ltd., molecular weight: 240)

VCAP: N-vinyl-ε-caprolactam (a monofunctional monomer, molecular weight: 139)

VEEA: 2-(2-vinyloxyethoxy)ethyl acrylate (a difunctional monomer, manufactured by Nippon Shokubai Co., Ltd., molecular weight: 186)

DPGDA: dipropylene glycol diacrylate (a difunctional monomer, manufactured by BASF Corporation, molecular weight: 242)

DCPA: tricyclodecanedimethanol diacrylate (a difunctional monomer, manufactured by Kyoeisha Chemical Co., Ltd., molecular weight: 306)

DDDA: 1,10-decanediol diacrylate (a difunctional monomer, molecular weight: 282)

TPGDA: tripropylene glycol diacrylate (a difunctional monomer, molecular weight: 300)

DPHA: dipentaerythritol hexaacrylate (a hexafunctional monomer, manufactured by Toagosei Co., Ltd., molecular weight: 578)

(Initiators)

EAB: 4,4'-diethylaminobenzophenone (manufactured by Daido Chemical Corporation), integrated absorbance: 48.0

TPO: 2,4,6-trimethylbenzoyl-diphenyl-phosphine oxide (manufactured by BASF Corporation), integrated absorbance: 11.1

ESACURE ONE: oligo[2-hydroxy-2-methyl-1-{4-(1-methylvinyl)phenyl}propanone](manufactured by Lamberti S.p.A.), integrated absorbance: 2.3

<Evaluation of Inkjet Ink Sets>

(Preparation of Inkjet Printed Items)

Using combinations of the prepared inks, an inkjet discharge apparatus fitted with a Kyocera head was used to print a 70% solid image onto a PET K2411 substrate manufactured by Lintec Corporation, under printing conditions including a frequency of 20 kHz, a head temperature of 43° C., and an ink drop volume of 14 pl.

When a 4-color ink set was discharged, discharge was performed in the order shown in Table 2.

Using either one or both of the following light sources, the inks were cured in the open air, thus obtaining an inkjet printed article.

LED: LED lamp manufactured by Integration Technology Ltd. (385 nm, integrated light irradiance at 10 m/sec: 566 mw/cm$^2$)

Metal halide: 160 W/cm metal halide lamp (365 nm) manufactured by Harison Toshiba Lighting Corporation Conveyor speed: 50 m/min, ultraviolet curing was performed with a single pass.

When two or more lamps were used, the lamps were installed with the lamp separation distance shown in Table 2.

<Evaluation of Residual Components>

(Extraction and Calculation of Amounts of Residual Unreacted Monomers and Initiators in Cured Film)

Using the four colors of cyan, magenta, yellow and black, an A4-size cured film obtained by printing sample number 5 (bicycle) of the high-precision color digital standard image data (JSA-00001 according to ISO/JIS-SCID JISX 9201) was cut into one cm squares, including the substrate, and these squares were then immersed for three days at 60° C. in a sealed container containing 100 ml of methyl ethyl ketone, thereby extracting the residual components from within the coating film. After three days, the stirred and homogenous methyl ethyl ketone extraction solution was removed from the container, and the extracted components were analyzed by GCMS (GCMS-QP2010 Plus, manufactured by Shimadzu Corporation) and HPLC (manufactured by Shimadzu Corporation). Calibration curves were prepared for the detected compounds, and the amount of each compound was then quantified to calculate the amounts of residual unreacted monomers and initiators in the cured film.
(Cured Film Weight)

The cured film weight was calculated in the following manner.

Cured film weight=weight of printed article (cured film+substrate)−substrate weight prior to printing (Monomer Residue Ratio)

The residue ratio of unreacted monomer remaining in the cured film was calculated in the following manner.

Monomer residue ratio=total weight of extracted monomers (g)/cured film weight (g)

(Initiator Residue Ratio)

The residue ratio of unreacted initiator remaining in the cured film was calculated in the following manner.

Initiator residue ratio=total weight of extracted initiators (g)/cured film weight (g)

The evaluation criteria were as follows.

5: monomer residue ratio of 0.1% or less, initiator residue ratio of 4% or less

4: monomer residue ratio of greater than 0.1% but not more than 0.3%, initiator residue ratio of greater than 4% but not more than 6%

3: monomer residue ratio of greater than 0.3% but not more than 0.4%, initiator residue ratio of greater than 6% but not more than 8%

2: monomer residue ratio of greater than 0.4% but not more than 0.5%, initiator residue ratio of greater than 8% but not more than 10%

1: monomer residue ratio of greater than 0.5%, initiator residue ratio of greater than 10%

The evaluation score of either of the monomer and the initiator components whose residual amount was larger was recorded.

Evaluations of printed articles for food packaging conducted in accordance with EUPIA guidance (EuPIA Guideline on Printing Inks applied to the non-food contact surface of food packaging materials and articles) were conducted for each of the raw materials, and it was found that by ensuring that the amount of residual monomers and initiators in the cured product was not more than a prescribed level, a result lower than the lower limit for the migration value into the food substitute evaluation liquid could be achieved. Based on these results, it was determined that in the present invention, a monomer residue ratio of 0.5% or less (an evaluation of 2 or higher) and an initiator residue ratio of 10% or less (an evaluation of 2 or higher) represented a practically applicable level.
(Evaluation of Wrinkling)

The obtained printed articles were evaluated visually using the following 5-grade evaluation. A grade of 3 or better was deemed a passing grade.

5: absolutely no wrinkling

4: some localized wrinkling observed

3: wrinkling observed across about 10% of the printed surface area

2: wrinkling observed across about 50% of the printed surface area

1: wrinkling observed across the entire printed surface area, also whitening (Evaluation of Tack)

Each printed article was rubbed with a cotton swab, and a 5-grade evaluation was performed. A grade of 3 or better was deemed a passing grade.

5: even after rubbing 10 times back and forth, no marks formed on the printed surface 4: marks remained on the printed surface after rubbing 10 times back and forth 3: marks remained on the printed surface after rubbing 5 times back and forth 2: the substrate was visible after rubbing 5 times back and forth 1: the substrate was visible after rubbing 2 times back and forth

TABLE 2

| | Order | Example 1 | Example 2 | Example 3 | Example 4 | Example 5 | Example 6 | Example 7 | Example 8 |
|---|---|---|---|---|---|---|---|---|---|
| Printing order | 1 | Ink 1 | Ink 1 | Ink 1 | Ink 1 | Ink 2 | Ink 3 | Ink 8 | Ink 8 |
| | 2 | Ink 9 | Ink 9 | Ink 9 | Ink 9 | Ink 9 | Ink 9 | Ink 1 | Ink 1 |
| | 3 | Ink 7 | Ink 7 | Ink 7 | Ink 7 | Ink 7 | Ink 7 | Ink 9 | Ink 9 |
| | 4 | Ink 5 | Ink 5 | Ink 5 | Ink 5 | Ink 5 | Ink 5 | Ink 5 | Ink 5 |
| Light source | 1 | LED | metal halide | LED | LED | LED | LED | LED | LED |
| | 2 | metal halide | | | | metal halide | metal halide | metal halide | metal halide | LED |
| Time between light sources | | 0.5 sec | 0.5 sec | 0.5 sec | 5 sec | 0.5 sec | 0.5 sec | 0.5 sec | 0.5 sec |
| Residual components | | 5 | 3 | 3 | 4 | 5 | 4 | 5 | 4 |
| Wrinkling | | 5 | 4 | 5 | 5 | 5 | 5 | 5 | 5 |
| Tack | | 5 | 5 | 4 | 4 | 5 | 5 | 5 | 4 |

TABLE 2-continued

|  | Order | Example 9 | Comparative Example 1 | Comparative Example 2 | Comparative Example 3 | Comparative Example 4 | Comparative Example 5 |
|---|---|---|---|---|---|---|---|
| Printing order | 1 | Ink 8 | Ink 4 | Ink 1 | Ink 1 | Ink 5 | Ink 2 |
|  | 2 | Ink 1 | Ink 9 | Ink 9 | Ink 7 | Ink 7 | Ink 8 |
|  | 3 | Ink 9 | Ink 7 | Ink 7 | Ink 9 | Ink 9 | Ink 5 |
|  | 4 | Ink 5 | Ink 5 | Ink 6 | Ink 5 | Ink 1 | Ink 10 |
| Light source | 1 | metal halide | metal halide | LED | LED | LED | LED |
|  | 2 | metal halide |  |  |  | metal halide | metal halide |
| Time between light sources |  | 0.5 sec | 0.5 sec | 0.5 sec | 0.5 sec | 0.5 sec | 0.5 sec |
| Residual components |  | 4 | 1 | 1 | 1 | 1 | 1 |
| Wrinkling |  | 4 | 2 | 2 | 4 | 2 | 3 |
| Tack |  | 5 | 4 | 4 | 4 | 2 | 2 |

As is shown in Table 2, the amounts of residual components in the cured films of Examples 1 to 9 were small, and it is thought that migration of the ink components into the foodstuffs is extremely unlikely to occur even during long-term storage of the printed articles. Further, the cured films exhibited no wrinkling or tack, with the inks functioning well as an ink set. Among the examples, Examples 1, 5 and 7 exhibited the best results from the viewpoints of residual components, wrinkling and tack.

In Comparative Example 1, because the total absorbance of ink 4 is low, curing did not proceed at the inner surface, the amount of residual components in the cured film was large, and wrinkling occurred. In Comparative Example 2, the total absorbance of ink 6 was extremely high, and therefore the outer surface curing proceeded first, slowing the progress of the inner surface curing and resulting in a large amount of residual components in the cured film and wrinkling. In Comparative Example 3, the total absorbance values for inks 7 and 9 are reversed in the printing order, and similar effects to those observed in Comparative Example 2 meant that the amount of residual components in the cured film was large. Comparative Example 4 shows the results of printing the inks in order of increasing total absorbance, and this also resulted in a large amount of residual components in the cured film, and the development of wrinkling and tack. In Comparative Example 5, because ink 10 with a total absorbance of less than 50 was used, the outer surface curing was inadequate, the amount of residual components in the cured film was large, and tack occurred.

Examples 10 to 29, Comparative Examples 6 to 9

<Preparation of Inks>

Using the same method as that used for preparation of the above colorant dispersions, colorant dispersions A to D were prepared using the following colorants.

Dispersion A: PB15:3
Dispersion B: PV19
Dispersion C: PY180
Dispersion D: PB7

The remaining monomers other than DPGDA, initiators, an inhibitor and a surface tension regulator were added sequentially under stirring to 8.3 parts of each of the thus obtained colorant dispersions A to D to obtain the formulations shown in Table 3, and each of the resulting mixtures was mixed gently until the initiators dissolved. In Table 3, #1 for example represents a 4-color ink set of cyan, magenta, yellow and black, and each of the inks that constitute this set, with the exception of having a different type of colorant, have the same formulation and blend amounts shown in Table 3. The blend amounts for each of the components shown in the table all represent "parts by weight".

(Viscosity Measurement)

The viscosity of each prepared ink was measured using a TVE25L viscometer manufactured by Toki Sangyo Co., Ltd. Measurements were performed in a 25° C. circulating chiller environment, by setting the viscometer to a rotational rate appropriate for the measurement (a rotational rate of 20 rpm for inks of 20 mPa·s or less, or a rotational rate of 10 rpm for inks having a viscosity greater than 20 mPa·s), and then reading the viscosity after a period of 3 minutes.

TABLE 3

|  |  |  | Molecular weight | Ink #1 | #2 | #3 | #4 | #5 | #6 | #7 |
|---|---|---|---|---|---|---|---|---|---|---|
|  |  | Colorant |  | 2.5 | 2.5 | 2.5 | 2.5 | 2.5 | 2.5 | 2.5 |
|  | Dispersant | SP32000 |  | 1.25 | 1.25 | 1.25 | 1.25 | 1.25 | 1.25 | 1.25 |
| Monomers | Monofunctional | LA | 240 |  |  |  |  |  | 13 | 20 |
|  |  | VCAP | 139 |  |  |  |  |  |  |  |
|  | Difunctional | VEEA | 186 | 23 | 23 | 23 | 23 | 13 | 23 | 23 |
|  |  | DPGDA | 242 | 50.65 | 53.65 | 55.65 | 58.65 | 50.65 | 28.65 | 57.65 |
|  |  | DDDA | 282 |  |  |  |  |  |  |  |
|  |  | TPGDA | 300 |  |  |  |  |  |  |  |
|  |  | DCPA | 306 | 10 | 10 | 10 | 10 | 10 | 10 | 10 |
|  | Hexafunctional | DPHA | 578 |  |  |  |  |  | 5 |  |
|  | Initiators | Irg819 | 418 | 3 | 2 | 2 | 1 | 2 | 2 |  |
|  |  | Irg369 | 367 | 2 | 2 | 2 | 1 | 2 | 2 |  |
|  |  | ESACURE ONE | 438 |  | 1 | 1 |  | 1 | 1 | 3 |
|  |  | EAB | 324 |  |  |  | 1 |  |  | 2 |
|  |  | TPO | 348 | 7 | 4 | 2 | 1 | 4 | 4 |  |

TABLE 3-continued

| | | | | | | | | | |
|---|---|---|---|---|---|---|---|---|---|
| Stabilizer | Phenothiazine | 199 | 0.1 | 0.1 | 0.1 | 0.1 | 0.1 | 0.1 | 0.1 |
| Surface tension regulator | UV3510 | | 0.5 | 0.5 | 0.5 | 0.5 | 0.5 | 0.5 | 0.5 |
| Total | | | 100 | 100 | 100 | 100 | 100 | 100 | 100 |
| Sum of integrated values of absorbance from 380 to 410 nm | | | 93 | 58 | 35 | 66 | 58 | 58 | 96 |
| Amount of initiator/amount of monomer | | | 0.14 | 0.10 | 0.08 | 0.04 | 0.10 | 0.10 | 0.06 |
| Ink viscosity (mPa · s) | cyan | | 13 | 12 | 12 | 12 | 12 | 13 | 14 |
| | magenta | | 14 | 13 | 13 | 13 | 13 | 14 | 15 |
| | yellow | | 14 | 13 | 13 | 13 | 13 | 14 | 15 |
| | black | | 13 | 12 | 12 | 12 | 12 | 12 | 14 |

| | | Molecular | Ink | | | | | | |
|---|---|---|---|---|---|---|---|---|---|
| | | weight | #8 | #9 | #10 | #11 | #12 | #13 | #14 |
| Colorant | | | 2.5 | 2.5 | 2.5 | 2.5 | 2.5 | 2.5 | 2.5 |
| Dispersant | SP32000 | | 1.25 | 1.25 | 1.25 | 1.25 | 1.25 | 1.25 | 1.25 |
| Monomers Monofunctional | LA | 240 | 13 | | | | | | |
| | VCAP | 139 | | 20 | | | | | |
| Difunctional | VEEA | 186 | 23 | 23 | | | 10 | 23 | 23 |
| | DPGDA | 242 | 20.65 | 33.65 | 43.65 | 16.65 | 41.65 | 61.65 | 48.65 |
| | DDDA | 282 | 30 | | | 23 | | | |
| | TPGDA | 300 | | | | 70 | | | |
| | DCPA | 306 | | 10 | 20 | | 25 | 10 | 10 |
| Hexafunctional | DPHA | 578 | | | | | 10 | | |
| Initiators | Irg819 | 418 | 2 | 2 | 2 | 2 | 2 | | 2 |
| | Irg369 | 367 | 2 | 2 | 2 | 2 | 2 | | 2 |
| | ESACURE ONE | 438 | 1 | 1 | 1 | 1 | 1 | | 1 |
| | EAB | 324 | | | | | | | |
| | TPO | 348 | 4 | 4 | 4 | 4 | 4 | 1 | 9 |
| Stabilizer | Phenothiazine | 199 | 0.1 | 0.1 | 0.1 | 0.1 | 0.1 | 0.1 | 0.1 |
| Surface tension regulator | UV3510 | | 0.5 | 0.5 | 0.5 | 0.5 | 0.5 | 0.5 | 0.5 |
| Total | | | 100 | 100 | 100 | 100 | 100 | 100 | 100 |
| Sum of integrated values of absorbance from 380 to 410 nm | | | 58 | 58 | 58 | 58 | 58 | 11 | 113 |
| Amount of initiator/amount of monomer | | | 0.10 | 0.10 | 0.10 | 0.10 | 0.10 | 0.01 | 0.17 |
| Ink viscosity (mPa · s) | cyan | | 14 | 13 | 18 | 19 | 40 | 12 | 12 |
| | magenta | | 15 | 14 | 19 | 20 | 45 | 13 | 13 |
| | yellow | | 15 | 14 | 19 | 20 | 42 | 13 | 13 |
| | black | | 14 | 13 | 18 | 19 | 40 | 12 | 12 |

(Preparation of Inkjet Printed Items)

Using each of the prepared inks and, as shown in Tables 4 and 5, using each of the heads described below, single pass printing was performed at a conveyor speed of 50 m/min.

The order of ink discharge was set to cyan, magenta, yellow, and then black.

Kyocera: an inkjet discharge apparatus fitted with a head (KJ4A) manufactured by Kyocera Corporation was used to discharge the ink onto a PET K2411 substrate manufactured by Lintec Corporation, under printing conditions including a frequency of 20 kHz, a head temperature of 40° C., an ink drop volume of 6 to 14 pl, and resolution of 600×600 dpi.

TEC: an inkjet discharge apparatus fitted with a head (CA3) manufactured by Toshiba Tec Corporation was used to discharge the ink onto a PET K2411 substrate manufactured by Lintec Corporation, under printing conditions including a frequency of 5 kHz, a head temperature of 40° C., an ink drop volume of 42 pl, and resolution of 150×150 dpi.

Following ink impact, as shown in Tables 4 and 5, one of the following light sources were used to perform ultraviolet curing to obtain a cured film.

LED+metal halide: ultraviolet curing was performed in a single pass at a conveyor speed of 50 m/min using one LED lamp manufactured by Integration Technology Ltd. (385 nm, 10 m/sec, integrated light irradiance 566 mw/cm$^2$), and then one 160 W/cm metal halide lamp manufactured by Harison Toshiba Lighting Corporation.

Metal halide+metal halide: ultraviolet curing was performed in a single pass at a conveyor speed of 50 m/min using two 160 W/cm metal halide lamps manufactured by Harison Toshiba Lighting Corporation.

When two or more lamps were used, the distance between the lamps was set so that the second lamp was irradiated 0.5 seconds after the first lamp.

(Oxygen Concentration)

During ultraviolet curing, by feeding nitrogen-enriched air, obtained by changing the flow rate of a gas separation module SEPAREL MJ-G530C manufactured by DIC Corporation, into the interior of the inkjet discharge apparatus, the oxygen concentration during curing was altered as shown in Table 4 and Table 5. The oxygen concentration described here represents the oxygen concentration at the printed article surface during ultraviolet irradiation. The oxygen concentration was measured by installing a combustion flue gas oxygen analyzer HT-1200N (manufactured by Hodaka Co., Ltd.) immediately prior to the ultraviolet irradiation unit inside the inkjet discharge apparatus, and recording the average measured value.

<Cured Film Evaluations>

(Extraction and Calculation of Amounts of Residual Unreacted Monomers and Initiators in Cured Film)

Using the same method as that used in Examples 1 to 10, the amounts of residual unreacted monomers and initiators in the cured film were determined.

(Odor)

Evaluation of the odor was performed by smelling the printed article immediately following printing and curing. The evaluation criteria were as follows, with an evaluation of Δ or better being deemed acceptable.

O: almost no odor immediately after curing, no possibility of loss of taste or flavor of foodstuff Δ: subtle odors of monomers or initiators were detected immediately after curing, but no odors were detectable after one hour, no possibility of loss of taste or flavor of foodstuff (Text)

Text was evaluated by printing predetermined text onto a printing substrate using a black ink, and then determining the smallest point size at which the text could be read. The evaluation criteria were as follows, with an evaluation of Δ or better being deemed favorable.

O: 4 pt text could be read

Δ: 8 pt text could be read, but 4 pt text could not be read x: 8 pt text could not be read

TABLE 4

|  | Example |  |  |  |  |  |  |  |  |  |  |  |
|---|---|---|---|---|---|---|---|---|---|---|---|---|
|  | 10 | 11 | 12 | 13 | 14 | 15 | 16 | 17 | 18 | 19 | 20 | 21 |
| Ink set | #1 | #1 | #1 | #2 | #2 | #2 | #3 | #3 | #3 | #2 | #4 | #5 |
| Head | Kyocera | Kyocera | Kyocera | Kyocera | Kyocera | Kyocera | Kyocera | Kyocera | Kyocera | Kyocera | Kyocera | Kyocera |
| Light source | LED + metal halide | LED + metal halide | LED + metal halide | LED + metal halide | LED + metal halide | LED + metal halide | LED + metal halide | LED + metal halide | LED + metal halide | metal halide + metal halide | metal halide + metal halide | metal halide + metal halide |
| Oxygen concentration during curing (% by volume) | 1 | 5 | 15 | 1 | 5 | 15 | 1 | 5 | 15 | 5 | 5 | 5 |
| Monomer residue ratio | 0.11% | 0.12% | 0.40% | 0.11% | 0.12% | 0.41% | 0.12% | 0.13% | 0.42% | 0.32% | 0.34% | 0.35% |
| Initiator residue ratio | 5% | 5% | 8% | 4% | 4% | 6% | 4% | 4% | 6% | 6% | 5% | 6% |
| Odor | O | O | Δ | O | O | Δ | O | O | Δ | Δ | Δ | Δ |
| Image quality | O | O | O | O | O | O | O | O | O | O | O | O |
| Text | O | O | O | O | O | O | O | O | O | O | O | O |

TABLE 5

|  | Example |  |  |  |  |  |  |  | Comparative Example |  |  |  |
|---|---|---|---|---|---|---|---|---|---|---|---|---|
|  | 22 | 23 | 24 | 25 | 26 | 27 | 28 | 29 | 6 | 7 | 8 | 9 |
| Ink set | #6 | #7 | #8 | #9 | #10 | #11 | #2 | #2 | #12 | #13 | #14 | #2 |
| Head | Kyocera | Kyocera | Kyocera | Kyocera | Kyocera | Kyocera | Kyocera | TEC | Kyocera | Kyocera | Kyocera | Kyocera |
| Light source | LED + metal halide | LED + metal halide | LED + metal halide | LED + metal halide | LED + metal halide | LED + metal halide | LED + metal halide | LED + metal halide | LED + metal halide | LED + metal halide | LED + metal halide | LED + metal halide |
| Oxygen concentration during curing (% by volume) | 5 | 5 | 5 | 5 | 5 | 5 | 5 | 5 | 5 | 5 | 5 | 21 (in air) |
| Monomer residue ratio | 0.38% | 0.43% | 0.36% | 0.45% | 0.39% | 0.49% | 0.02% | 0.13% | 0.15% | 8.00% | 0.15% | 3.00% |
| Initiator residue ratio | 6% | 9% | 5% | 7% | 7% | 9% | 2% | 3% | 5% | 4% | 20% | 9% |
| Odor | Δ | Δ | Δ | Δ | Δ | Δ | O | O | O | X | X | X |
| Image quality | O | O | O | O | Δ | Δ | O | Δ | X | O | O | O |
| Text | O | O | O | O | Δ | Δ | O | Δ | X | O | O | O | x: strong odor of monomers or initiators immediately after curing, with the odor still detectable one day after curing, possible loss of taste or flavor of foodstuff (Image Quality)

Evaluation of the image quality was performed by visual evaluation of a sample number 5 (bicycle) of the high-precision color digital standard image data (JSA-00001 according to ISO/JIS-SCID JISX 9201) printed using the four colors of cyan, magenta, yellow and black. The evaluation criteria were as follows, with an evaluation of Δ or better being deemed favorable.

O: image quality superior to practically applicable quality levels in the labeling market Δ: image quality equivalent to practically applicable quality levels in the labeling market x: image quality that does not satisfy practically applicable quality levels in the labeling market As shown in Table 4, in each of Examples 10 to 19, the monomer residue ratio in the cured film was 0.5% by weight or less, the initiator residue ratio was 10% by weight or less, and the odor of the cured film was substantially at the undetectable level. Further, the image quality and text were also favorable, and of a quality favorable for use on foodstuff labels. Among the examples, Examples 10, 11, 13, 14, 16 and 17 each exhibited a monomer residue ratio in the cured film of 0.3% by weight or less and an initiator residue ratio of 6% or less, meaning it is thought to be extremely unlikely that ink components could migrate into the foodstuff, even if the printed article was stored for an extended period, and because a high-quality, high-precision image was able to be printed by high-speed printing, these inks are ideal for use on foodstuff labels.

On the other hand, as shown in Table 5, in Comparative Example 6 the ink viscosity at discharge was too high, and therefore energy transfer into the ink did not occur efficiently in the head, the discharge was unstable, and the image quality of both the image and the text did not reach practically applicable levels. Further, in Comparative Example 7, in which the ratio of (amount of initiator)/(amount of monomer) was too low, the monomer curing reaction did not proceed satisfactorily, and a large amount of monomer remained in the cured film. In Comparative Example 8, because the initiator was present in considerable excess relative to the monomer, a large amount of initiator remained in the cured film. In both Comparative Examples 7 and 8, the odor following printing and curing was strong, and the inks were therefore unsuitable for use on foodstuff labels, not only because the odor could impair the taste and flavor of the foodstuff, but because there is a possibility of migration of residual components into the foodstuff. Further, in Comparative Example 9 curing was performed under an open atmosphere oxygen concentration (21% by volume), and the oxygen caused a curing inhibitory effect at the curing film surface, meaning monomer was retained in the cured film, and therefore the ink was unsuitable for use on foodstuff labels for the reasons outlined above.

The invention claimed is:

1. A method for producing an active energy ray-curable inkjet ink cured film which uses an active energy ray-curable inkjet ink for use in a single pass printing inkjet system, comprising curing an active energy ray-curable inkjet ink, wherein the active energy ray-curable inkjet ink comprises a colorant, monomers, and at least one initiator, wherein 0.02≤amount of initiator/amount of monomer≤0.16 (weight ratio) is satisfied, the monomers comprise a difunctional monomer having ethylene oxide or propylene oxide as the main backbone, wherein the difunctional monomer is in an amount of from 50 to 100% by weight of the total monomer component, the difunctional monomer comprises 2-(2-vinyloxyethoxy)ethyl acrylate (VEEA) in an amount of 10 to 60% by weight relative to the total weight of the active energy ray-curable inkjet ink, the monomers comprise a monomer having a molecular weight of not more than 300, and further comprise a monomer having a molecular weight of more than 300 in an amount of 15% by weight or less relative to the total weight of the active energy ray-curable inkjet ink, and the initiator comprises at least bis(2,4,6-trimethylbenzoyl)-phenylphosphine oxide, the viscosity of the active energy ray-curable inkjet ink at 25° C. is not more than 20 mPa·s, and the active energy ray-curable inkjet ink is cured with irradiation of the active energy rays under an atmosphere in which an oxygen concentration is less than an oxygen concentration in open air, wherein the oxygen concentration in the atmosphere during the irradiation of the active energy ray is from 0.5 to 10% by volume.

2. The method for producing the active energy ray-curable inkjet ink cured film according to claim 1, wherein the monomer comprises a polyfunctional monomer and optionally a monofunctional monomer and satisfies 0≤amount of the monofunctional monomer/amount of the polyfunctional monomer ≤0.2 (weight ratio).

3. The method for producing the active energy ray-curable inkjet ink cured film according to claim 1, wherein the ink is cured using a light source having an emission intensity local maximum within a wavelength range from 300 to 450 nm.

4. The method for producing the active energy ray-curable inkjet ink cured film according to claim 1, wherein the ink is cured using at least a light source having an emission intensity local maximum at a wavelength of 380 nm or higher.

5. The method for producing the active energy ray-curable inkjet ink cured film according to claim 3, wherein the light source is a combination of a light source having an emission intensity local maximum at a wavelength of at least 380 nm but less than 450 nm, and a light source having an emission intensity local maximum at a wavelength of at least 300 nm but less than 380 nm.

6. The method for producing the active energy ray-curable inkjet ink cured film according to claim 1, wherein the initiator further comprises at least one compound selected from the group consisting of 2-benzyl-2-dimethylamino-1 (4-morpholinophenyl)-butanone-1, 2,4,6-trimethylbenzoyldiphenylphosphine oxide, oligo[2-hydroxy-2-methyl-1-{4-(1-methylvinyl)phenyl}propanone] and 4,4'-diethylaminobenzophenone.

7. The method for producing the active energy ray-curable inkjet ink cured film according to claim 1, wherein the initiator further comprises oligo [2-hydroxy-2-methyl-1-{4-(1-methylvinyl)phenyl}propanone].

* * * * *